United States Patent
Baumgarten et al.

(10) Patent No.: US 9,378,468 B2
(45) Date of Patent: Jun. 28, 2016

(54) GENERIC BOXED COMPONENTS FOR MULTI-CLIENT SYSTEMS

(75) Inventors: Kai Baumgarten, Rauenberg (DE); Andreas Blumenthal, Heidelberg (DE); Rolf Hammer, Karlsruhe (DE); Kerstin Hoeft, Wiesloch (DE); Jens Lieberum, Ketsch (DE); Helmut Prestel, Bad Schoenborn (DE); Andreas S. Schmitt, Kaiserslautern (DE); Welf N. Walter, Rauenberg (DE); Ralf Wendelgass, Leimen (DE); Sigrid K. Wortmann, Heidelberg (DE)

(73) Assignee: SAP SE, Walldorf (DE)

( * ) Notice: Subject to any disclaimer, the term of this patent is extended or adjusted under 35 U.S.C. 154(b) by 1132 days.

(21) Appl. No.: 12/979,035

(22) Filed: Dec. 27, 2010

(65) Prior Publication Data

US 2012/0166523 A1 Jun. 28, 2012

(51) Int. Cl.
*G06F 15/16* (2006.01)
*G06Q 10/00* (2012.01)

(52) U.S. Cl.
CPC ..................... *G06Q 10/00* (2013.01)

(58) Field of Classification Search
CPC .................................................. G06Q 10/00
USPC .......................................................... 709/203
See application file for complete search history.

(56) References Cited

U.S. PATENT DOCUMENTS

| | | | |
|---|---|---|---|
| 7,058,698 B2 * | 6/2006 | Chatterjee et al. | 709/218 |
| 7,356,615 B2 * | 4/2008 | Cai et al. | 709/246 |
| 7,644,414 B2 * | 1/2010 | Smith et al. | 719/328 |
| 7,839,856 B2 * | 11/2010 | Sinha et al. | 370/392 |
| 8,489,640 B2 * | 7/2013 | Schlarb | G06F 17/30864 707/792 |
| 2002/0038390 A1 * | 3/2002 | Callsen | G06F 9/4428 719/330 |
| 2003/0033357 A1 * | 2/2003 | Tran et al. | 709/203 |
| 2003/0033358 A1 * | 2/2003 | Tran et al. | 709/203 |
| 2003/0033434 A1 * | 2/2003 | Kavacheri et al. | 709/246 |
| 2004/0015567 A1 * | 1/2004 | Ziebold et al. | 709/219 |
| 2008/0304485 A1 * | 12/2008 | Sinha et al. | 370/392 |
| 2010/0162147 A1 * | 6/2010 | Ritter | G06Q 10/00 715/764 |
| 2012/0173485 A1 * | 7/2012 | Kothule et al. | 707/634 |
| 2013/0326543 A1 * | 12/2013 | Aull | G06F 9/544 719/321 |

\* cited by examiner

*Primary Examiner* — Douglas Blair
(74) *Attorney, Agent, or Firm* — Fountainhead Law Group PC

(57) ABSTRACT

In one embodiment, a method includes defining a parent structure including an extension. A polymorphic structure is defined for the extension. The polymorphic structure is associated with a plurality of client specialization structures, each client specialization being associated with a client in a plurality of clients. During runtime by a computing device, the parent structure is generated with an extension to a client specialization structure associated with one of the plurality of clients where client specialization structures associated with other clients are not visible to the parent structure.

20 Claims, 7 Drawing Sheets

GENERIC BOXED COMPONENTS FOR MULTI-CLIENT SYSTEMS

BACKGROUND

Particular embodiments generally relate to business processes.

An application platform may implement business objects to support different business solutions. A business object, for example, is a software model representing real-world items used during the transaction of business. A business object may comprise a SalesOrder object model or an Organization object model. Instances of these object models, in turn, represent specific data (e.g., SalesOrder SO435539, ACME corporation).

A business object may specify business logic and/or data having any suitable structure. The structure may be determined based on the requirements of a business scenario in which the instance is to be deployed. A business application for a particular business scenario may require many business object instances, where the structure of each has been determined based on the requirements of the particular business scenario.

A customer deploying a business solution may desire changes to a business object included in the business solution. For example, a customer may require a field (e.g., SerialNumber) that does not exist within the Product business object of a business solution. In addition, another customer may require an additional node or query within the Product business object of the same business solution.

Some conventional application platforms support the addition of extension fields to nodes of existing business objects. Consequently, these application platforms are able to store data associated with instances of these extension fields in a primary persistency (e.g., a relational database, flat files). This data can then be consumed by user interfaces, queries and other entities supported by the application platforms. However, when the field is added, recompilation may be needed. When multiple clients are using the system and structures are extended, other programs being run by the clients are affected by the recompilation being performed and may have their programs aborted.

SUMMARY

In one embodiment, a method includes defining a parent structure including an extension. A polymorphic structure is defined for the extension. The polymorphic structure is associated with a plurality of client specialization structures, each client specialization being associated with a client in a plurality of clients. During runtime, by a computing device, the parent structure is generated with an extension to a client specialization structure associated with one of the plurality of clients where client specialization structures associated with other clients are not visible to the parent structure.

In one embodiment, the method includes adding information for a client specialization structure associated with a client in the plurality of clients and creating a component in the client specialization structure for the client.

In one embodiment, the method includes creating a set of switches for a set of components in the client specialization structure associated with the one of the plurality of clients and using the set of switches to determine which components to include in the client specialization structure at runtime.

In one embodiment, the contents of the polymorphic structure are not known at compile time and the polymorphic structure includes the client specialization structure associated with one of the plurality of clients at runtime.

In one embodiment, a non-transitory computer-readable storage medium containing instructions for controlling a computer system is provided. The instructions control a computer system to be operable to: define a parent structure including an extension; define a polymorphic structure for the extension, the polymorphic structure being associated with a plurality of client specialization structures, each client specialization being associated with a client in a plurality of clients; and generate, during runtime, the parent structure with an extension to a client specialization structure associated with one of the plurality of clients, wherein client specialization structures associated with other clients are not visible to the parent structure.

In one embodiment, an apparatus includes one or more computer processors and a computer-readable storage medium comprising instructions for controlling the one or more computer processors. The instructions control a computer system to be operable to: define a parent structure including an extension; define a polymorphic structure for the extension, the polymorphic structure being associated with a plurality of client specialization structures, each client specialization being associated with a client in a plurality of clients; and generate, during runtime, the parent structure with an extension to a client specialization structure associated with one of the plurality of clients, wherein client specialization structures associated with other clients are not visible to the parent structure.

The following detailed description and accompanying drawings provide a better understanding of the nature and advantages of the present invention.

DETAILED DESCRIPTION

Described herein are techniques for a framework for generic boxed components. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
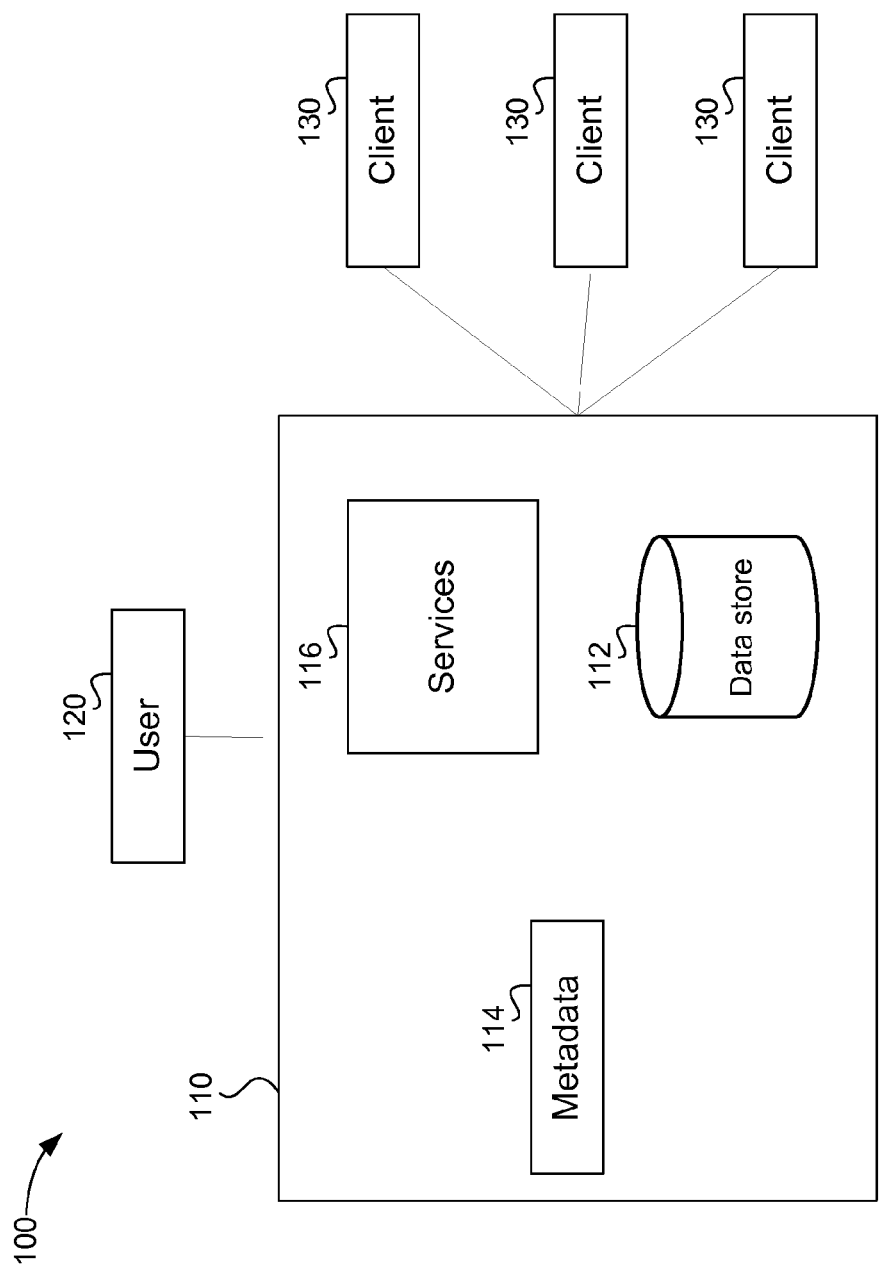
FIG. 1 depicts an example of a system according to one embodiment.

FIG. 1 depicts an example of a system 100 according to one embodiment. System 100 includes business service provider 110 for providing business services to user 120 on behalf of client 130. For example, client 130 may represent an enterprise employing business service provider 110 to facilitate business processes, and user 120 may represent any entity (e.g., an employee of client 130) requiring interaction with business service provider 110 to further the business processes of client 130.

Several clients 130, which may be referred to as tenants, may run on one system 100. Each client 130 is only supposed to have access to the client's own independent data. Particular embodiments allow clients 130 to extend structures without causing recompilation of other clients' structures.

User 120 might comprise a Personal Computer (PC) or mobile device executing a Web client. Examples of a Web client include, but are not limited to, a Web browser, an execution engine (e.g., JAVA, Flash, Silverlight) to execute associated code in a Web browser, and/or a proprietary standalone application.

User 120 may execute a Web browser to access services 116 via HyperText Transport Protocol (HTTP) communication. For example, a user 120 may submit via a user interface an instruction (e.g., "show me a sales report"). User 120, in response, may transmit a corresponding HTTP service request to business service provider 110. Services 116 may conduct any processing required by the request (e.g., generating views and user interfaces) and, after completing the processing, provide a response to user 120.

Business service provider 110 might receive requests from user 120 and provide responses to user 120 via a service-oriented architecture. The use of remotely-hosted business service provider 110 may help client 130 avoid the costs and problems associated with maintaining a local, "in house" Enterprise Resource Planning (ERP) system.

Business service provider 110 might store client information into and retrieve client information from physical tables of data store 112. Data store 112 may be a relational database. Alternatively, data store 112 could be a multi-dimensional database, an eXtendable Markup Language (XML) document, or any other structured data storage system. The physical tables may be distributed among several relational databases, dimensional databases, and/or other data sources. To provide economies of scale, data store 112 may include data of more than one client. This may be considered a multi-tenancy system. Business service provider 110 includes mechanisms to ensure that a client/user accesses only the data that the client/user is authorized to access.

The structures of and relationships between the physical database tables may be complex, and business objects may be used to shield developers and end-users from these complexities. A business object may comprise, for example, a software model including nodes to encapsulate related data and methods. As described above, a business object may be associated with a business entity, such as a client, partner, sales order, product, store, time, etc., represented in the data of a data source. Each instance of a business object may represent a particular instance of the entity represented by the business object. An instance of a SalesOrder business object may, for example, provide a mapping to the underlying tables storing data associated with a particular sales order.

Metadata 114 includes metadata defining metadata models and object models. The object models (or objects) are instances of the metadata models. The metadata models may include generic models of a BI view, a floorplan, a business object, a user interface text, a process component, a data type and a message type, but embodiments are not limited thereto. The metadata models and object models may be embodied in any type of data structure, including but not limited to eXtensible Markup Language files. As in the conventional storage of object instance data, the metadata defining the specific metadata models and object models may be stored in database tables and/or any other suitable format.

Each metadata model may comprise an instance of a same meta-metadata model. The meta-metadata model may consist of nodes, composite associations, associations, elements structure and attribute properties. Development of specific business objects, specific floorplans, etc. may therefore proceed using the same development technologies. Moreover, access and lifecycle issues of the various object models may be managed using similar (or identical) mechanisms.

Metadata 114 provides information regarding the structure and attributes of the data of underlying business object instances (i.e., the data stored in data store 112). Metadata 114 may include design-time and/or runtime proxy objects generated based on other metadata (e.g., an eXtensible Markup Language (XML) representation of a business object) stored therein. For example, metadata 114 may include Advanced Business Application Programming (ABAP) proxy objects which are consumed by ABAP code of applications/services residing in business service provider 110.

Services 116 include any business services that are or become known. Services 116 may provide user 120 with user interfaces, print forms, search capabilities, message interfaces (e.g., A2X, B2B), etc. based on data stored in data store 112 and defined by metadata 114.

Services 116 may use metadata 114 to access data of data store 112. In accordance with this paradigm, an extension field that is modeled within the metadata as a generic boxed component of a business object and allows services 116 to store and retrieve data associated with the extension field. Generic boxed components allow different clients 130 to use client-specific specializations for a parent structure. Changes can be made to client-specific specializations without having impact on other clients 130. For example, recompilation of the parent structure or other clients' specializations may not be performed. The generic box may be a substructure whose components are not known at compile time. The generic box may refer to a polymorphic structure that is a virtual structure that will differ per client. A client specialization may be a client specific view on the polymorphic structure in a client.

As will be described in more detail below, metadata 114 may be used to define the parent structure and generic boxed components. In one embodiment, a data dictionary is used to instantiate a generic boxed component. The data dictionary is a centralized repository of information that includes relationships between parent structures and generic boxed components. The data dictionary is stored in database 112.

As described above with respect to a change to a user interface, extension fields may be added to these entities in order to retrieve data and provide services including extension field data. For purposes of the present description, entities to which extension fields may be added in order to consume corresponding business object data will be referred to as consuming business entities.

Client 130 may customize consuming business entities which are provided by business service provider 110. In particular, client 130 may add components to a generic boxed component to a user interface (and to its corresponding business object). Embodiments may facilitate addition of the component of a client specialization to other consuming business entities. This addition may be performed without affecting other clients 130.

Figure 2A:
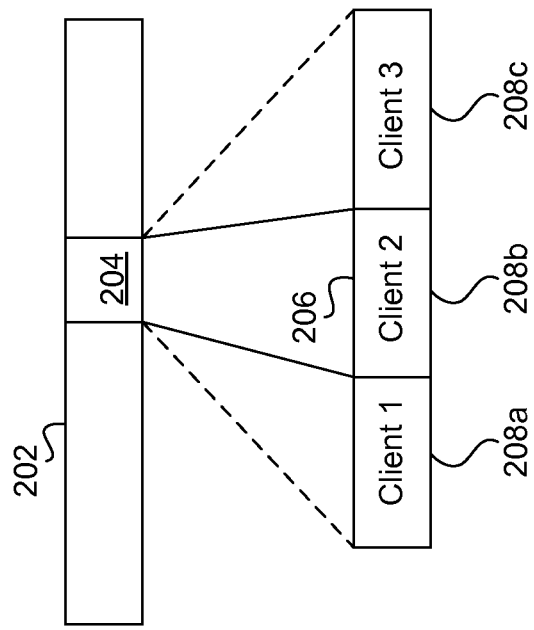
FIG. 2a depicts a design-time example of a parent structure according to one embodiment.

FIG. 2a depicts a design-time example of a parent structure 202 according to one embodiment. Parent structure 202 may correspond to a business object node. An extension field 204 may be a field in a data structure that allows extensions to be added to parent structure 202. The extensions that are added do not change the structure of parent structure 202.

In one embodiment, a developer of a business service provider may define extension fields 204 for various consuming business entities. An extension field definition may point to a specific portion of a consuming business entity (e.g., a location on a user interface) into a field in the data model of the user interface (i.e., as representing the path down to a corresponding persistent business object node).

Extension field 204 may be classified as a generic boxed component. A generic box is a substructure the components of which are not known at compile time. At design-time, extension field 204 points to polymorphic structure 206. The polymorphic structure may be a virtual structure that looks different for multiple clients at runtime. For example, at design time, polymorphic structure 206 may be associated with client specializations 208 for a client 1, a client 2, and a client 3. Each client specialization 208 of polymorphic structure 206 may be a client-specific structure. For example, client specialization 208a may be a client-specific section for client 1, client specialization 208b may be a client-specific section for client 2, and client specialization 208c may be a client-specific section for client 3. Each of these client specializations may be an extension of field 204 of parent structure 202 at runtime.

Each client specialization may assign a set of components to the generic box. Each client specialization 208 may also include components, which may be associated with fields of a user interface. For example, a SerialNumber may be added as component of client specialization 208.

Figure 2B:
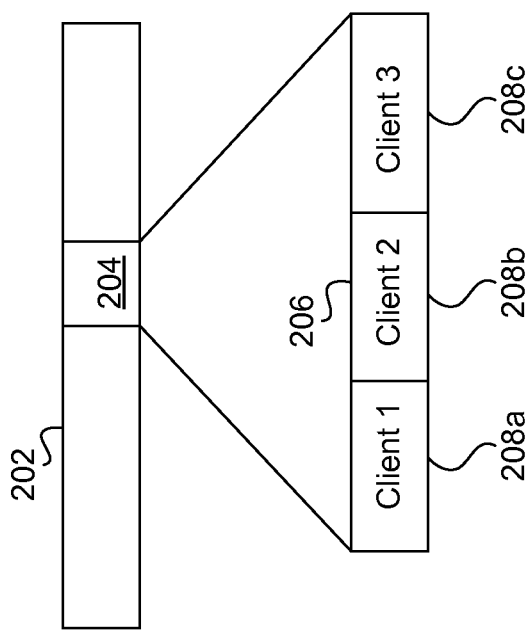
FIG. 2b depicts a runtime view of the parent structure according to one embodiment.

FIG. 2b depicts a runtime view of parent structure 202 according to one embodiment. During design-time, polymorphic structure 206 is associated with field 204. Also, client specializations 208 may be associated with polymorphic structure 206; however, it is not know which client specialization 208 will be included at design-time.

During runtime, one client is selected. In this case, client 2 may be using the services 116. In this case, client specialization 208b is visible through extension field 204. However, components for client specializations 208a and 208c are not visible. Thus, when a component in polymorphic structure 206 is accessed through extension field 204, the component for client specialization 208b is accessed for client 2.

Particular embodiments derive polymorphic structure 206 at runtime. For example, during compile time, the contents of polymorphic structure 206 that will apply at runtime are not known. The compiled program code does not contain client specific information. At runtime, when a client specialization 208 is selected, the contents of polymorphic structure 206 are generated with the selected client specialization 208.

Particular embodiments allow for changes to one client specialization 208, but these changes do not impact other client specializations 208. That is, neither recompilation of the other client specializations nor recompilation of the parent structure 202 is necessary. In this case, only recompilation of the affected client specialization 208 may be performed.

In one embodiment, a definition of the generic boxed component is performed in the data dictionary found in metadata 114. In one example, the definition is performed via an application programming interface (API). Via this API, a structure component may be designated to be a generic boxed component corresponding to the extension field 204.

Figure 3:
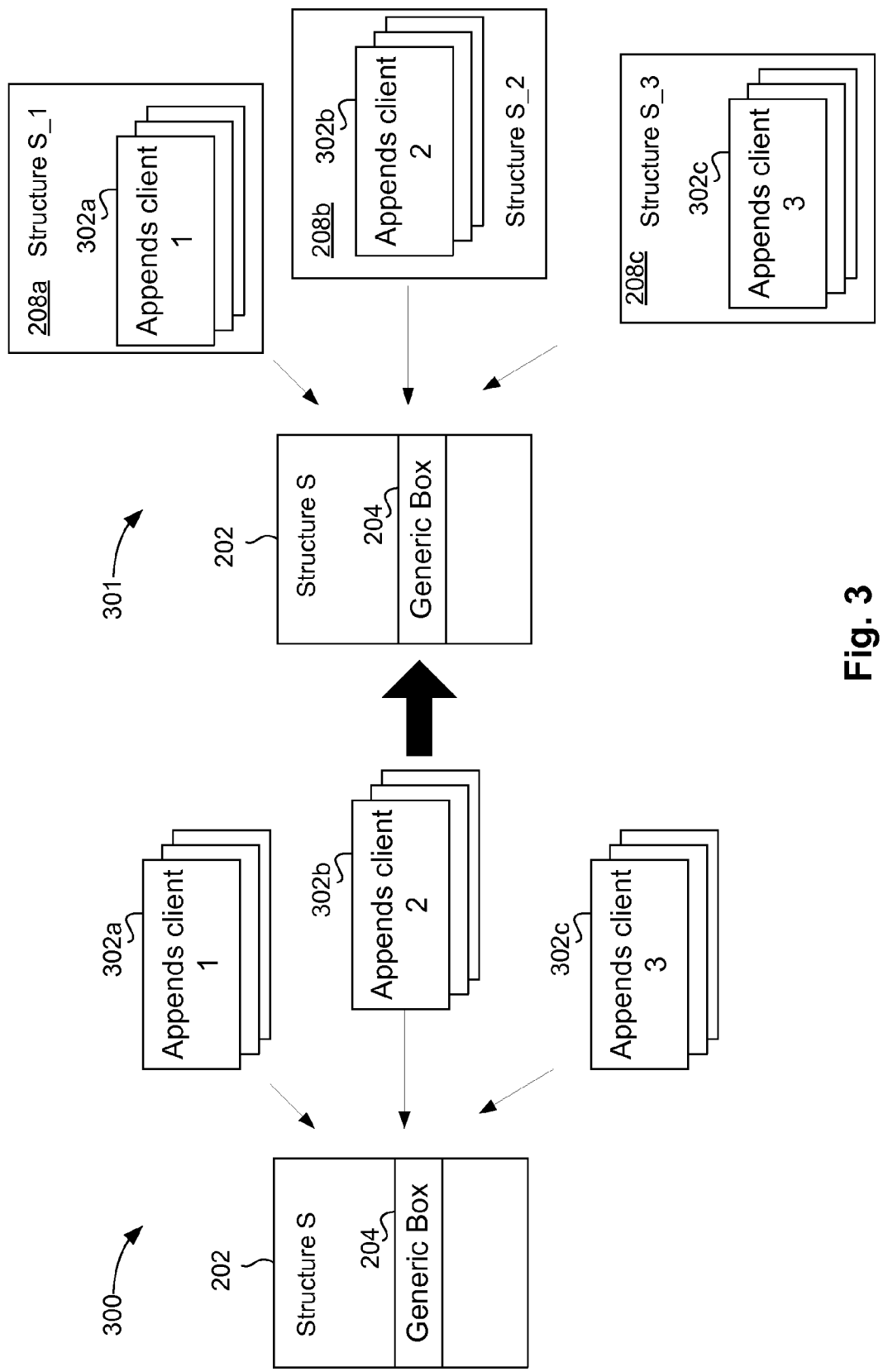
FIG. 3 depicts an example of activating a generic boxed component using the data dictionary according to one embodiment.

FIG. 3 depicts an example of activating a generic boxed component using the data dictionary according to one embodiment. At 301, parent structure 202 is shown with extension field 204 of a generic boxed component. An API may be used to append components to client specializations 208 of polymorphic structure 206. For example, procedures in Advanced Business Application Programming (ABAP) may be used to activate dictionary appends 302 during an activation process. Dictionary appends 302 are a way to extend data dictionary structures without directly manipulating the original structure definition. Dictionary appends 302 may be associated with a specific client and the activation process then creates all necessary client specializations 208. The activation process does neither change parent structure 202 nor activate parent structure 202. Changes of appends also cause regeneration in the exact same structures that use them.

At 300, different dictionary appends 302 are created for clients 1-3. For example, appends 302a-302c may be created. Each append 302 may add one or more components to polymorphic structure 206 for the client.

As shown at 301, client specializations 208a-208c have been generated for clients 1-3. Each client specialization 208 may be a data structure that includes components appended for that client.

Figure 4:
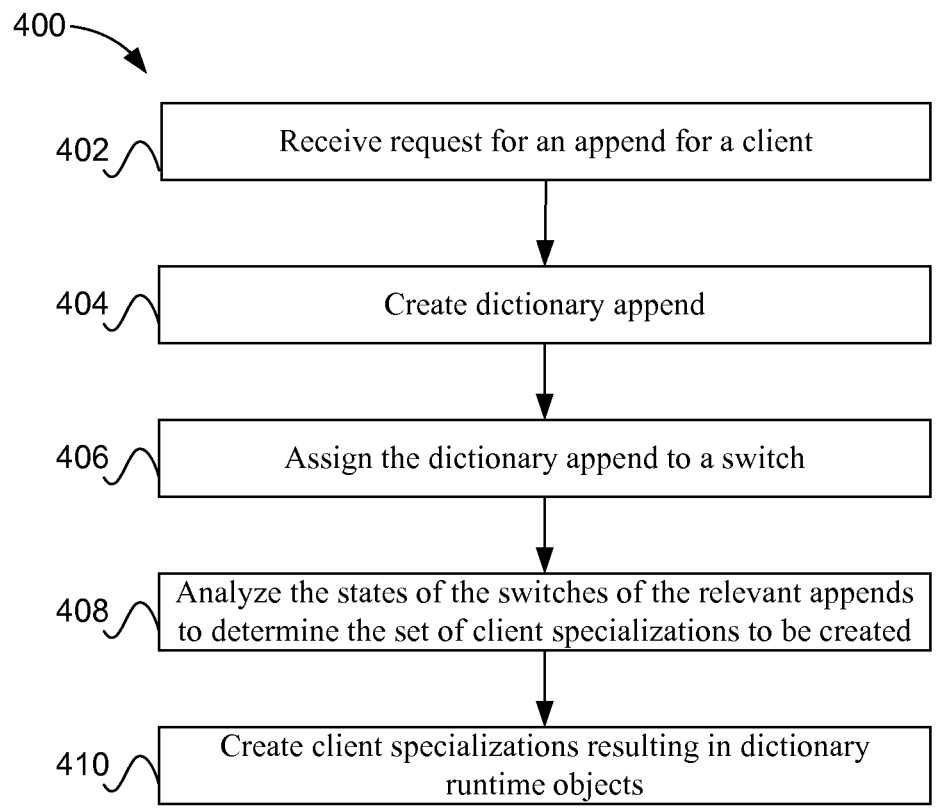
FIG. 4 depicts an example of a method for adding components to a generic box according to one embodiment.

FIG. 4 depicts an example of a method for adding components to a generic box according to one embodiment. At 402, a request for an append for a client is received.

When a request for an append 302 is received, at 404, a dictionary append is created. At 406, dictionary append 302 is assigned to a switch. A switch may be regarded as a Boolean function that may depend upon a combination of (SwitchID, Client). SwitchID may be the identifier for the switch and Client is the identifier for the client 130. The switch may be used to indicate whether the components of the append are to be used or not. If the switch is on, the components may be included in client specialization 208.

At 408, the states of the switches of the relevant appends 302 may be analyzed to determine the set of client specializations 208 to be created. At 410, client specializations 208 are created resulting in dictionary runtime objects.

In conventional application platforms with type safe access to structure components, a change in the structure definition requires a recheck and recompilation of all programs using the structure. Additionally, for optimized component access, address information (e.g. offset and length) may be included in compiled code. In particular embodiments using generic boxed components, this address information is transferred to dictionary runtime objects for the client specializations 208 and not reflected in the compiled programs. Hence, any change to appends 302 does not cause a recompilation of programs accessing parent structure 202. However access to non-generic boxed components of the parent structure remains optimized.

Figure 5A:
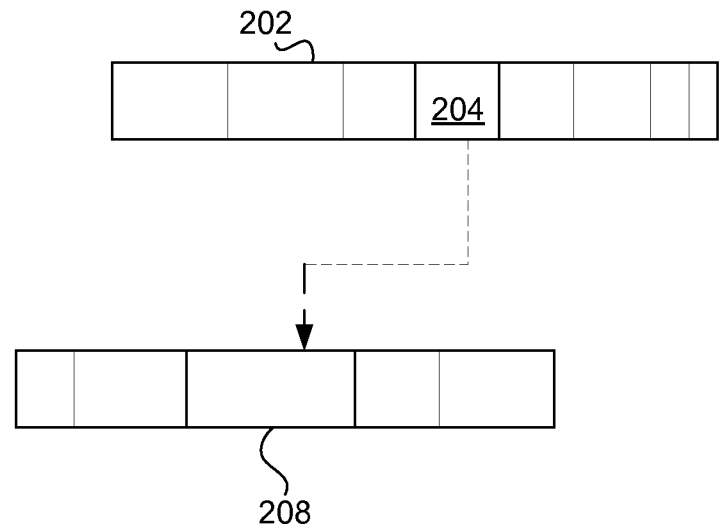
FIGS. 5a-5c show different views for generic boxed components.
Figure 5B:
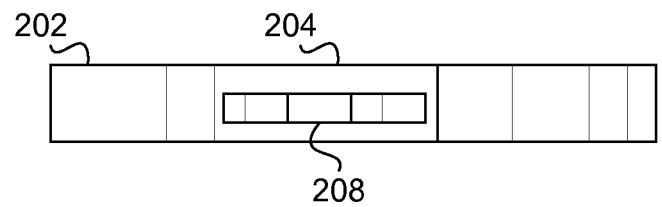
Figure 5C:
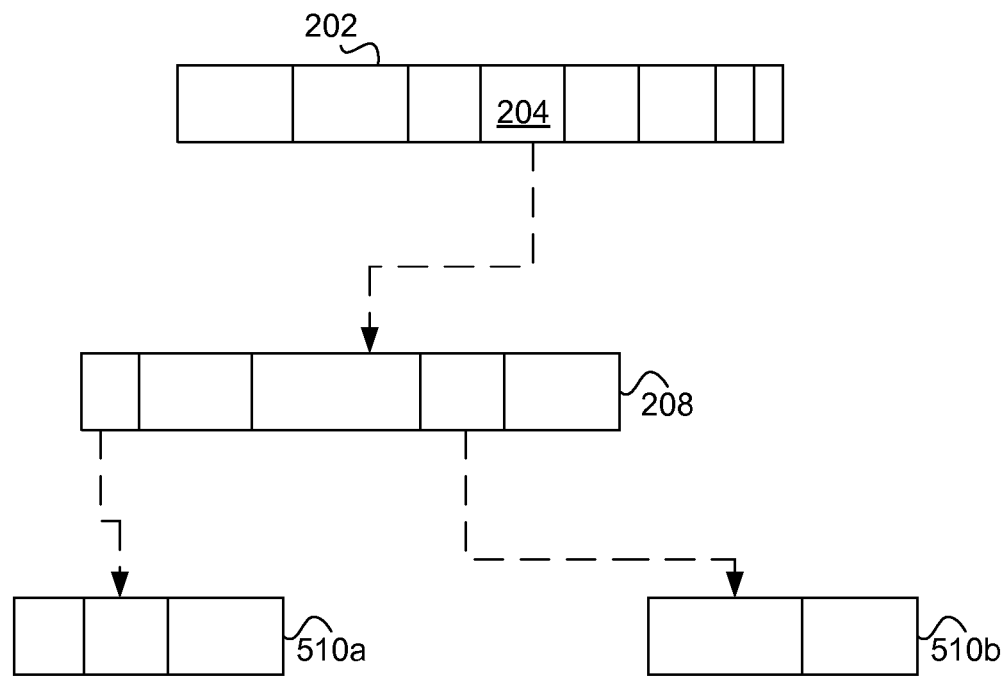

FIGS. 5a-5c show different views for generic boxed components. FIG. 5a depicts an example of a runtime view according to one embodiment. As shown, extension field 204 as a generic boxed component of parent structure 202 refers to the specialization 208b of client 2. Internally, the access to the client specialization may be realized via a reference at runtime. Referring to FIG. 5b, which shows a developer's view, from a developer's perspective components of client specializations 208 behave like components in substructures, i.e. they have value semantics and offer type safety like an embedded substructure.

As a consequence of the generic boxed components' value semantics, adding extension fields 204 to already existing structure types preserves, among others, the semantics of copy and compare operations on parent structure 204. Thus, the impact on the functional behavior of existing programs is minimized.

FIG. 5c shows a nested view according to one embodiment. Generic boxed components can be nested. That is, any client specialization 208 may contain further generic boxed components. At runtime, this results internally in a tree like representation. The nodes of the tree are the root parent structure and all client specializations 208. The edges link the extension fields to their respective client specializations 208. For example, client specialization 208a is a generic boxed component of extension field 204a. Also, client specializations 208b and 208c are generic boxed components of extension fields 204b and 204c, respectively.

Also, it may be possible to define aggregate types on base of types containing generic boxed components, e.g. classes, collections and complex structures.

To allow generic boxed components to operate in system 110, certain restrictions may be imposed. Although ABAP is discussed, the restrictions may be applied to similar concepts in other programming languages. In one embodiment, static access to a generic box or its components is not allowed. Static access may be usage checked, evaluated and optimized by a compiler. In another embodiment, static access may be allowed syntactically but internally it is converted by the compiler to a dynamic access using the dictionary runtime object at runtime.

Examples for static access in the programming language, such as ABAP, may be a reset of all values stored in extension field 204 of some structure variable (struc) to their initial values or an assignment of a value (val) to some component (comp) of the generic box (ext). For example, the following ABAP statements may result in syntax errors:
CLEAR struc-ext.
struc-ext-comp=val.

Also, static reference to the type of a generic box or its components is not allowed. One example for static type access in ABAP is the declaration of some variable (var) referring to a component (comp) of a generic box (ext) of type (ty):
DATA var TYPE ty-ext-comp.

Another example would be sorting an Internal Table (itab) by some component located in a generic box. Internal Tables are ABAP's built-in collections with fixed element type:
SORT itab BY ext-comp.
Both examples result in syntax errors.

One example for a valid static specification of a generic box in ABAP is the statement MOVE-CORRESPONDING. It assigns all components of the extension field (ext1) of a structure (struc1) to corresponding components of the extension field (ext2) of a structure (struc2) having identical names:
MOVE-CORRESPONDING struc1-ext1 TO struc2-ext2.

Since the component name matching cannot be done at compile time, it is deferred to the runtime.

Another example for a valid static specification may occur in the definition of a simple transformation. Simple transformations are a programming language to convert data between an XML representation and ABAP. Simple transformations may access components of a generic box statically.

At runtime, generic boxes behave like substructures. For example, a copy of a structure variable (struc1) containing some generic boxed component to a structure variable (struc2) may result in a deep copy of the structure itself and its client specialization 208 for the current client:
struc2=struc1.
Analogously, resetting a structure variable (struc) to its initial value also affects the contents of its generic box.
CLEAR struc.

In general, single components of a generic box may be accessed dynamically at runtime. Dynamic access means that the mapping of the name of a component to the technical addressing information is deferred to runtime. For example, in ABAP the statement ASSIGN may be used to provide access to a component via its name:
ASSIGN COMPONENT name OF STRUCTURE struc TO <fs>.
Here, the variable name may contain the text string 'ext-comp'.

In ABAP, dynamic component access may be allowed for Internal Table statements. The actual names of the components to be used for sorting the Internal Table are given by the content of the variables name1, name2, name3:
SORT itab BY (name1) (name2) (name3).

In one embodiment, a generic box may contain no components at all, i.e. the polymorphic structure 206 contains no components for a specific client. In this case, the box is called empty and the length of the generic box 208 would be zero.

In one embodiment, up to the first write access to the contents of a generic box, no memory is allocated for the box instance. In this case, the generic boxed component is called initial.

There are restrictions for cross-client access because the specializations 208 may be different in different clients. For export to database/shared memory/shared buffer instructions, the data can only be stored in client-dependent clusters. For example, in ABAP Shared Objects, generic boxes can only be stored in client-dependent areas.

Figure 6:
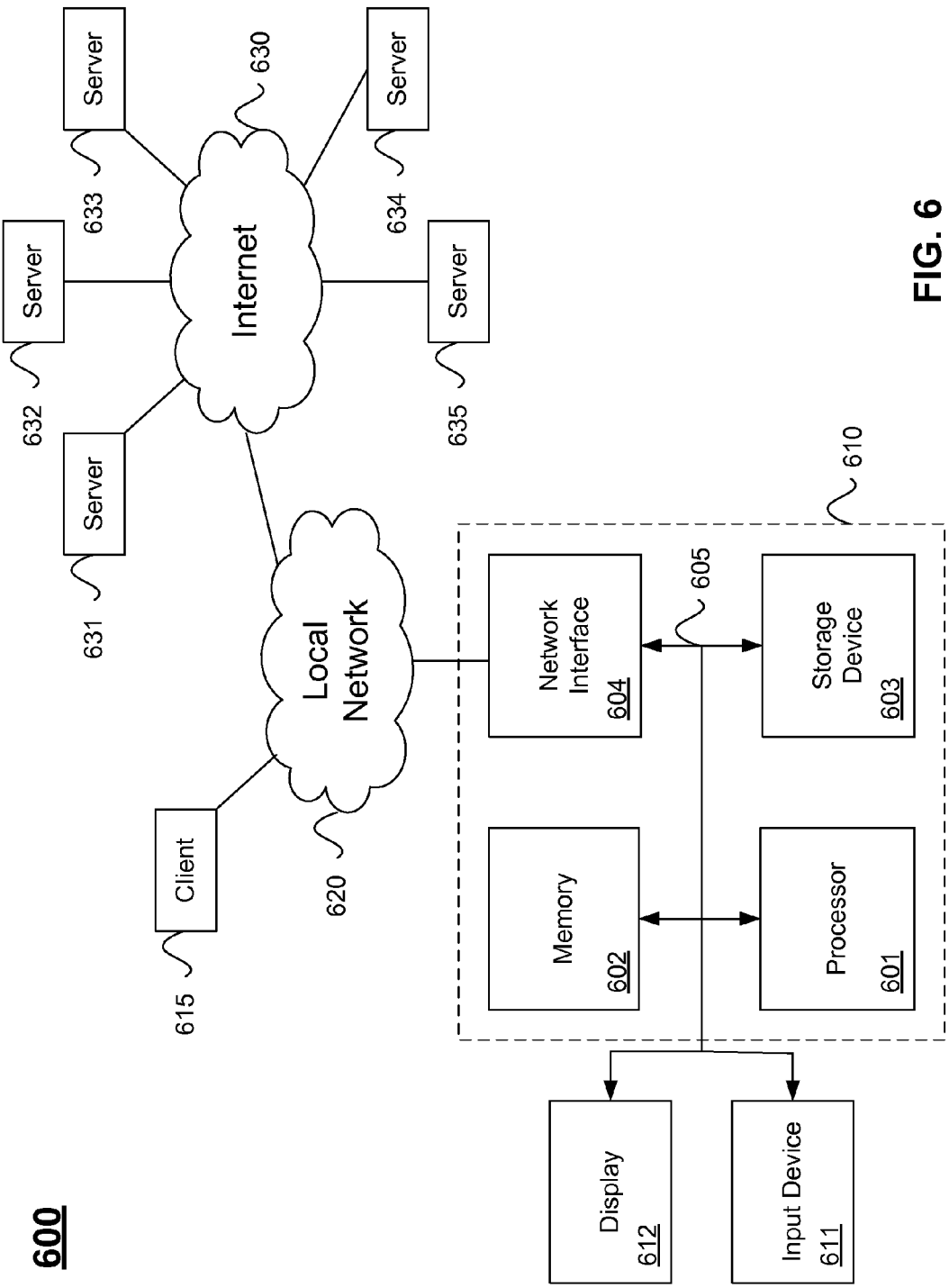
FIG. 6 illustrates hardware of a special purpose computing machine configured with framework for generic boxed components according to one embodiment.

FIG. 6 illustrates hardware of a special purpose computing machine configured with framework for generic boxed components according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
  storing a parent data structure including an extension in a data store;
  providing a polymorphic structure that is associated with the extension in the data store, the polymorphic structure being associated with a plurality of client specialization structures for a plurality of clients, wherein the plurality of client specialization structures include client-specific information stored in the data store;
  determining, by a computing device, a compiled application for providing a service to the plurality of clients that execute the compiled application, wherein the compiled application does not contain client-specific information found in the plurality of client specializations and the plurality of clients have access to their own client-specific information in the plurality of client specializations through the compiled application;
  executing, by the computing device, the compiled application to allow a first client to access the service provided by the compiled application; and
  generating, by the computing device, during executing of the compiled application, the polymorphic structure to include a first client specialization structure associated with the first client in the plurality of clients, wherein:
  the compiled application uses the extension in the parent data structure to access client-specific information for the first client in the first client specialization structure of the polymorphic structure,
  client specialization structures associated with other clients are not accessible through the extension in the parent data structure, and
  a generated polymorphic structure including client-specific information for a second client associated with a second client specialization structure of the polymorphic structure includes different client-specific information for the second client in the second client specialization structure from the first client specialization structure and is accessible though the extension in the parent data structure.

2. The method of claim 1, further comprising:
  adding information for the second client specialization structure associated with the second client in the plurality of clients; and
  creating a component in the second client specialization structure for the second client.

3. The method of claim 2, wherein the compiled application that uses the parent data structure is not recompiled upon creating the component.

4. The method of claim 2, wherein the compiled application uses the parent data structure to access the polymorphic structure including a third client specialization structure that includes the created component for the second client, wherein the parent data structure is not being recompiled.

5. The method of claim 1, further comprising:
  creating a set of switches for a set of components in the first client specialization structure associated with the first client; and
  using the set of switches to determine which components to include in the first client specialization structure during executing of the compiled application.

6. The method of claim 5, wherein each component in the first client specialization structure is associated with a switch in the set of switches, each switch indicating whether to include each component in the set of components in the first client specialization structure.

7. The method of claim 5, wherein each client in the plurality of clients includes client-specific switches associated with client-specific components.

8. The method of claim 1, wherein static access to the first client specialization structure and the second client specialization structure is not allowed.

9. The method of claim 1, wherein dynamic access to the first client specialization structure generated during executing of the compiled application is allowed during runtime of the compiled application.

10. The method of claim 1, wherein client specialization structures for the polymorphic structure are different per client in the plurality of clients.

11. The method of claim 1, wherein contents of the polymorphic structure are not known before the application was compiled, wherein the polymorphic structure includes the first client specialization structure during executing of the compiled application.

12. A non-transitory computer-readable storage medium containing instructions for controlling a computer system to be operable to:
> store a parent data structure including an extension in a data store;
> provide a polymorphic structure that is associated with the extension in the data store, the polymorphic structure being associated with a plurality of client specialization structures for a plurality of clients, wherein the plurality of client specialization structures include client-specific information stored in the data store;
> determine a compiled application for providing a service to the plurality of clients that execute the compiled application, wherein the compiled application does not contain client-specific information found in the plurality of client specializations and the plurality of clients have access to their own client-specific information in the plurality of client specializations through the compiled application;
> execute the compiled application to allow a first client to access the service provided by the compiled application; and
> generate, during executing of the compiled application, the polymorphic structure to include a first client specialization structure associated with the first client in the plurality of clients, wherein:
> the compiled application uses the extension in the parent data structure to access client-specific information for the first client in the first client specialization structure of the polymorphic structure,
> client specialization structures associated with other clients are not accessible through the extension in the parent data structure, and
> a generated polymorphic structure including client-specific information for a second client associated with a second client specialization structure of the polymorphic structure includes different client-specific information for the second client in the second client specialization structure from the first client specialization structure and is accessible though the extension in the parent data structure.

13. The computer-readable storage medium of claim 12, further operable to:
> add information for the second client specialization structure associated with the second client in the plurality of clients; and
> create a component in the second client specialization structure for the second client.

14. The computer-readable storage medium of claim 13, wherein the compiled application that uses the parent data structure is not recompiled upon creating the component.

15. The computer-readable storage medium of claim 12, further operable to
> create a set of switches for a set of components in the second client specialization structure associated with the first client; and
> use the set of switches to determine which components to include in the first client specialization structure during executing of the compiled application.

16. The computer-readable storage medium of claim 12, wherein static access to the first client specialization structure and the second client specialization structure is not allowed.

17. The computer-readable storage medium of claim 12, wherein dynamic access to the first client specialization structure generated during executing of the compiled application is allowed during runtime of the compiled application.

18. The computer-readable storage medium of claim 12, wherein client specialization structures for the polymorphic structure are different per client in the plurality of clients.

19. The computer-readable storage medium of claim 12, wherein contents of the polymorphic structure are not known before the application was compiled, wherein the polymorphic structure includes the first client specialization structure during executing of the compiled application.

20. An apparatus comprising:
> one or more computer processors; and
> a computer-readable storage medium comprising instructions for controlling the one or more computer processors to be operable to:
> store a parent data structure including an extension in a data store;
> provide a polymorphic structure that is associated with the extension in the data store, the polymorphic structure being associated with a plurality of client specialization structures for a plurality of clients, wherein the plurality of client specialization structures include client-specific information stored in the data store;
> determine a compiled application for providing a service to the plurality of clients that execute the compiled application, wherein the compiled application does not contain client-specific information found in the plurality of client specializations and the plurality of clients have access to their own client-specific information in the plurality of client specializations through the compiled application;
> execute the compiled application to allow a first client to access the service provided by the compiled application; and
> generate, during executing of the compiled application, the polymorphic structure to include a first client specialization structure associated with the first client in the plurality of clients, wherein:
> the compiled application uses the extension in the parent data structure to access client-specific information for the first client in the first client specialization structure of the polymorphic structure,
> client specialization structures associated with other clients are not accessible through the extension in the parent data structure, and
> a generated polymorphic structure including client-specific information for a second client associated with a second client specialization structure of the polymorphic structure includes different client-specific information for the second client in the second client specialization structure from the first client specialization structure and is accessible though the extension in the parent data structure.

* * * * *